(12) United States Patent
Brännström et al.

(10) Patent No.: US 11,204,051 B2
(45) Date of Patent: Dec. 21, 2021

(54) ASSEMBLED PRODUCT AND A METHOD OF ASSEMBLING THE ASSEMBLED PRODUCT

(71) Applicant: Välinge Innovation AB, Viken (SE)

(72) Inventors: Hans Brännström, Höganäs (SE); Agne Pålsson, Hasslarp (SE); Peter Derelöv, Helsingborg (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

(21) Appl. No.: 16/915,258

(22) Filed: Jun. 29, 2020

(65) Prior Publication Data

US 2021/0148392 A1    May 20, 2021

Related U.S. Application Data

(63) Continuation of application No. 16/564,438, filed on Sep. 9, 2019, now Pat. No. 10,731,688, which is a
(Continued)

(30) Foreign Application Priority Data

Sep. 16, 2013  (SE) .................... 1351060-7

(51) Int. Cl.
*F16B 12/10* (2006.01)
*A47B 47/04* (2006.01)
(Continued)

(52) U.S. Cl.
CPC ............ *F16B 12/10* (2013.01); *A47B 47/042* (2013.01); *F16B 12/26* (2013.01); *F16B 12/44* (2013.01);
(Continued)

(58) Field of Classification Search
CPC .......... F16B 12/10; F16B 12/26; F16B 12/44; F16B 12/46; F16B 12/2009; F16B 12/38;
(Continued)

(56) References Cited

U.S. PATENT DOCUMENTS 291,032 A    1/1884    Cleland
634,581 A    10/1899   Miller
(Continued)

FOREIGN PATENT DOCUMENTS

AT    400 611 B    2/1996
CH    365 507 A    11/1962
(Continued)

OTHER PUBLICATIONS

U.S. Appl. No. 15/642,757, Peter Derelöv, filed Jul. 6, 2017.
(Continued)

*Primary Examiner* — Janet M Wilkens
(74) *Attorney, Agent, or Firm* — Buchanan Ingersoll & Rooney P.C.

(57) ABSTRACT

An assembled product includes at least three elements arranged in three different planes. A first element is connected perpendicular to a second element, and a third element is connected perpendicular to the second element. The assembled product includes one or more locking devices, each comprising a flexible tongue arranged in an insertion groove one of the at least three elements. The flexible tongue cooperates with a tongue groove, at an adjacent one of the at least three elements, for locking the one element and the adjacent element together. A second edge of the second element is connected to a second edge of the third element by a first of said locking devices.

6 Claims, 7 Drawing Sheets

Related U.S. Application Data continuation of application No. 14/486,681, filed on Sep. 15, 2014, now Pat. No. 10,451,097.

(51) Int. Cl.
 *F16B 12/46* (2006.01)
 *F16B 12/26* (2006.01)
 *F16B 12/44* (2006.01)

(52) U.S. Cl.
 CPC ...... *F16B 12/46* (2013.01); *A47B 2230/0081* (2013.01); *A47B 2230/0096* (2013.01); *F16B 2012/466* (2013.01); *Y10T 403/1666* (2015.01); *Y10T 403/443* (2015.01); *Y10T 403/447* (2015.01)

(58) Field of Classification Search
 CPC ............. F16B 12/125; F16B 2012/466; F16B 5/0614; A47L 47/042; A47L 47/04; A47L 47/00; A47L 47/0066; A47L 47/0075; A47L 13/003; A47L 13/021; A47L 2230/0081; A47L 2230/0096; A47L 2230/16; A47L 88/0014; A47L 96/201; Y10T 403/1666; Y10T 403/443; Y10T 403/447; E04F 2201/0523; E04F 15/02038; E04F 13/0894; E04C 2/33; E04C 2/40
 USPC ................. 403/19, 382, 376, 403, 327, 231; 52/285.1, 588.1, 582.1, 586.1; 312/265.5, 312/265.6, 257.1, 263, 107, 108, 11, 111
 See application file for complete search history.

(56) References Cited

U.S. PATENT DOCUMENTS

| | | |
|---|---|---|
| 701,000 A | 5/1902 | Ahrens |
| 861,911 A | 7/1907 | Stewart |
| 881,673 A | 3/1908 | Ellison |
| 1,533,099 A | 4/1925 | Carroll |
| 1,534,468 A | 4/1925 | Shea, Jr. |
| 1,800,386 A | 4/1931 | Hoffman |
| 1,800,387 A | 4/1931 | Greist |
| 1,802,245 A | 4/1931 | Foretich |
| 1,954,242 A | 4/1934 | Heppenstall |
| 2,360,451 A | 10/1944 | Stone |
| 2,362,904 A | 11/1944 | Kramer |
| 2,496,184 A | 1/1950 | Von Canon |
| 2,681,483 A | 6/1954 | Morawetz |
| 3,002,630 A | 10/1961 | Heisser |
| 3,195,968 A | 7/1965 | Freeman |
| 3,284,152 A | 11/1966 | Schörghuber |
| 3,313,054 A | 4/1967 | Madey |
| 3,347,610 A | 10/1967 | Pilliod |
| 3,410,441 A | 11/1968 | Rhyne |
| 3,722,704 A | 3/1973 | Piretti |
| 3,722,971 A | 3/1973 | Zeischegg |
| 3,742,807 A | 7/1973 | Manning |
| 3,765,465 A | 10/1973 | Gulistan |
| 3,784,271 A | 1/1974 | Schreiber |
| 3,884,002 A | 5/1975 | Logie |
| 3,885,845 A | 5/1975 | Krieks |
| 3,981,118 A | 9/1976 | Johnson et al. |
| 4,089,614 A | 5/1978 | Harley |
| 4,099,293 A | 7/1978 | Pittasch |
| 4,099,887 A | 7/1978 | Mackenroth |
| 4,116,510 A | 9/1978 | Franco |
| 4,142,271 A | 3/1979 | Busse |
| 4,211,379 A | 7/1980 | Morgan et al. |
| 4,222,544 A | 9/1980 | Crowder |
| 4,279,397 A | 7/1981 | Larsson |
| 4,299,067 A | 11/1981 | Bertschi |
| 4,308,961 A | 1/1982 | Kunce |
| 4,324,517 A | 4/1982 | Dey |
| 4,403,886 A | 9/1983 | Haeusler |
| 4,405,253 A | 9/1983 | Stockum |
| 4,509,648 A | 4/1985 | Govang |
| 4,593,734 A | 6/1986 | Wallace |
| 4,595,105 A | 6/1986 | Gold |
| 4,597,122 A | 7/1986 | Handler |
| 4,615,448 A | 10/1986 | Johnstonbaugh |
| 4,629,076 A | 12/1986 | Amstutz et al. |
| 4,750,794 A | 6/1988 | Vegh |
| 4,752,150 A | 6/1988 | Salice |
| 4,815,908 A | 3/1989 | Duran et al. |
| 4,817,900 A | 4/1989 | Whittington et al. |
| 4,844,266 A | 7/1989 | Small et al. |
| 4,883,331 A | 11/1989 | Mengel |
| 4,886,326 A | 12/1989 | Kuzyk |
| 4,888,933 A | 12/1989 | Guomundsson |
| 4,891,897 A | 1/1990 | Gieske et al. |
| 4,909,581 A | 3/1990 | Haheeb |
| 4,938,625 A | 7/1990 | Matsui |
| 4,944,416 A | 7/1990 | Petersen et al. |
| 4,961,295 A | 10/1990 | Kosch, Sr. et al. |
| 5,004,116 A | 4/1991 | Cattarozzi |
| 5,018,323 A | 5/1991 | Clausen |
| 5,109,993 A | 5/1992 | Hutchison |
| 5,114,265 A | 5/1992 | Grisley |
| 5,121,578 A | 6/1992 | Holz |
| 5,125,518 A | 6/1992 | Ward |
| 5,138,803 A | 8/1992 | Grossen |
| 5,209,556 A | 5/1993 | Anderson |
| 5,212,925 A | 5/1993 | McClinton |
| 5,299,509 A | 4/1994 | Ballard |
| 5,360,121 A | 11/1994 | Sothman |
| 5,375,802 A | 12/1994 | Branham, II |
| 5,423,155 A | 6/1995 | Bauer |
| 5,451,102 A | 9/1995 | Chuan |
| 5,458,433 A | 10/1995 | Stastny |
| 5,471,804 A | 12/1995 | Winter, IV |
| 5,475,960 A | 12/1995 | Lindal |
| 5,499,667 A | 3/1996 | Nakanishi |
| 5,499,886 A | 3/1996 | Short et al. |
| 5,507,331 A | 4/1996 | Nakanishi |
| 5,527,103 A | 6/1996 | Pittman |
| 5,536,108 A | 7/1996 | Kvalheim |
| 5,658,086 A | 8/1997 | Brokaw et al. |
| 5,711,115 A | 1/1998 | Wirt |
| 5,775,521 A | 7/1998 | Tisbo |
| 5,810,505 A | 9/1998 | Henriott |
| 5,882,098 A | 3/1999 | Brown et al. |
| 5,893,617 A | 4/1999 | Lee |
| 5,941,026 A | 8/1999 | Eisenreich |
| 5,944,294 A | 8/1999 | Baer |
| 5,950,389 A | 9/1999 | Porter |
| 6,045,290 A | 4/2000 | Nocievski |
| 6,050,426 A | 4/2000 | Leurdijk |
| 6,142,436 A | 11/2000 | Thurston et al. |
| 6,312,186 B1 | 11/2001 | Röck et al. |
| 6,349,507 B1 | 2/2002 | Muellerleile |
| 6,363,645 B1 | 4/2002 | Hunter |
| 6,413,007 B1 | 7/2002 | Lambright |
| 6,418,683 B1 | 7/2002 | Martensson |
| 6,491,172 B2 | 12/2002 | Chance |
| 6,505,452 B1 | 1/2003 | Hannig |
| 6,547,086 B1 | 4/2003 | Harvey |
| 6,578,498 B1 | 6/2003 | Draudt et al. |
| 6,675,979 B2 | 1/2004 | Taylor |
| D486,676 S | 2/2004 | Campbell et al. |
| 6,769,219 B2 | 8/2004 | Schwitte et al. |
| 6,772,890 B2 | 8/2004 | Campbell et al. |
| 6,827,028 B1 | 12/2004 | Callaway |
| 6,971,614 B2 | 12/2005 | Fischer et al. |
| 7,127,860 B2 | 10/2006 | Pervan |
| 7,223,045 B2 | 5/2007 | Migli |
| 7,228,977 B2 | 6/2007 | Perkins et al. |
| 7,300,120 B2 | 11/2007 | Shin |
| 7,451,535 B2 | 11/2008 | Wells et al. |
| 7,451,578 B2 | 11/2008 | Hannig |
| 7,584,583 B2 | 9/2009 | Bergelin et al. |
| 7,614,350 B2 | 11/2009 | Tuttle et al. |
| 7,621,092 B2 | 11/2009 | Groeke et al. |

(56) References Cited

U.S. PATENT DOCUMENTS

| | | |
|---|---|---|
| 7,641,414 B1 | 1/2010 | Joyce |
| 7,717,278 B2 | 5/2010 | Kao |
| 7,721,503 B2 | 5/2010 | Pervan et al. |
| 7,793,450 B2 | 9/2010 | Chasmer et al. |
| 7,818,939 B2 | 10/2010 | Bearinger |
| 7,998,549 B2 | 8/2011 | Susnjara |
| 8,033,074 B2 | 10/2011 | Pervan |
| 8,038,363 B2 | 10/2011 | Hannig |
| 8,042,311 B2 | 10/2011 | Pervan |
| 8,146,754 B2 | 4/2012 | Apgood |
| 8,220,217 B2 | 7/2012 | Muehlebach |
| 8,234,830 B2 | 8/2012 | Pervan |
| 8,365,499 B2 | 2/2013 | Nilsson et al. |
| 8,387,327 B2 | 3/2013 | Pervan |
| 8,464,408 B2 | 6/2013 | Hazzard |
| 8,495,849 B2 | 7/2013 | Pervan |
| 8,505,257 B2 | 8/2013 | Boo et al. |
| 8,544,230 B2 | 10/2013 | Pervan |
| 8,596,013 B2 | 12/2013 | Boo |
| 8,602,227 B1 | 12/2013 | McDonald |
| 8,615,952 B2 | 12/2013 | Engström |
| 8,713,886 B2 | 5/2014 | Pervan |
| 8,745,952 B2 | 6/2014 | Perra |
| 8,764,137 B2 | 7/2014 | Fehre |
| 8,776,473 B2 | 7/2014 | Pervan |
| 8,833,028 B2 | 9/2014 | Whispell et al. |
| 8,864,407 B1 | 10/2014 | Sorum |
| 8,882,416 B2 | 11/2014 | Baur et al. |
| 8,887,468 B2 | 11/2014 | Håkansson et al. |
| 9,175,703 B2 | 11/2015 | Maertens |
| 9,216,541 B2 | 12/2015 | Boo |
| 9,290,948 B2 | 3/2016 | Cappelle et al. |
| 9,375,085 B2 | 6/2016 | Derelöv |
| 9,538,842 B2* | 1/2017 | Hakansson ............ F16B 5/0056 |
| 9,655,442 B2 | 5/2017 | Boo et al. |
| 9,700,157 B2 | 7/2017 | Keyvanloo |
| 9,714,672 B2* | 7/2017 | Derelov ................ F16B 12/125 |
| 9,723,923 B2 | 8/2017 | Derelöv |
| 9,726,210 B2* | 8/2017 | Derelov et al. |
| 9,745,756 B2 | 8/2017 | Hannig |
| 9,758,973 B2 | 9/2017 | Segaert |
| 9,763,528 B2 | 9/2017 | Lung |
| 9,809,983 B2 | 11/2017 | Trudel |
| 9,945,121 B2* | 4/2018 | Derelov ................. F16B 12/24 |
| 10,034,541 B2 | 7/2018 | Boo et al. |
| 10,202,996 B2 | 2/2019 | Håkansson et al. |
| 10,378,570 B2 | 8/2019 | Broughton |
| 10,415,613 B2 | 9/2019 | Boo |
| 10,448,739 B2 | 10/2019 | Derelöv et al. |
| 10,451,097 B2* | 10/2019 | Brannstrom et al. |
| 10,486,245 B2 | 11/2019 | Fridlund |
| 10,506,875 B2 | 12/2019 | Boo et al. |
| 10,544,818 B2 | 1/2020 | Fridlund |
| 10,548,397 B2 | 2/2020 | Derelöv et al. |
| 10,669,716 B2 | 6/2020 | Derelöv |
| 10,670,064 B2 | 6/2020 | Derelöv |
| 10,724,564 B2 | 7/2020 | Derelöv |
| 10,731,688 B2* | 8/2020 | Brannstrom ......... A47B 47/042 |
| 10,736,416 B2 | 8/2020 | Derelöv et al. |
| 10,830,266 B2 | 11/2020 | Fridlund |
| 10,830,268 B2 | 11/2020 | Boo |
| 10,871,179 B2 | 12/2020 | Håkansson et al. |
| 10,876,562 B2* | 12/2020 | Pervan ................. A47B 47/025 |
| 10,876,563 B2* | 12/2020 | Derelov et al. |
| 10,968,936 B2 | 4/2021 | Boo et al. |
| 11,076,691 B2 | 8/2021 | Boo |
| 11,083,287 B2 | 8/2021 | Boo et al. |
| 2002/0170258 A1 | 11/2002 | Schwitte et al. |
| 2004/0165946 A1 | 8/2004 | Areh et al. |
| 2005/0042027 A1 | 2/2005 | Migli |
| 2005/0104483 A1 | 5/2005 | Saravis |
| 2005/0236544 A1 | 10/2005 | Mancino |
| 2005/0247653 A1 | 11/2005 | Brooks |
| 2006/0091093 A1 | 5/2006 | Armari |
| 2006/0101769 A1 | 5/2006 | Pervan et al. |
| 2006/0180561 A1 | 8/2006 | Wisnoski et al. |
| 2006/0236642 A1 | 10/2006 | Pervan |
| 2006/0273085 A1 | 12/2006 | Casto |
| 2007/0006543 A1 | 1/2007 | Engström |
| 2007/0028547 A1 | 2/2007 | Grafenauer et al. |
| 2007/0193178 A1 | 8/2007 | Groeke et al. |
| 2008/0010937 A1 | 1/2008 | Pervan et al. |
| 2008/0066415 A1 | 3/2008 | Pervan |
| 2008/0193209 A1 | 8/2008 | Henderson |
| 2008/0216435 A1 | 9/2008 | Nolan |
| 2008/0236088 A1 | 10/2008 | Hannig et al. |
| 2008/0244882 A1 | 10/2008 | Woxman et al. |
| 2009/0014401 A1 | 1/2009 | Tallman |
| 2009/0064624 A1 | 3/2009 | Sokol |
| 2010/0028592 A1 | 2/2010 | Barkdoll et al. |
| 2010/0083603 A1 | 4/2010 | Goodwin |
| 2010/0104354 A1 | 4/2010 | Spalding |
| 2010/0173122 A1 | 7/2010 | Susnjara |
| 2010/0289389 A1 | 11/2010 | Crabtree, II |
| 2011/0023303 A1 | 2/2011 | Pervan et al. |
| 2011/0225921 A1 | 9/2011 | Schulte |
| 2011/0225922 A1 | 9/2011 | Pervan et al. |
| 2011/0280655 A1 | 11/2011 | Maertens et al. |
| 2011/0283650 A1* | 11/2011 | Pervan .................... E04F 15/04 |
| | | 52/588.1 |
| 2012/0009383 A1 | 1/2012 | Hardesty |
| 2012/0027967 A1 | 2/2012 | Maertens et al. |
| 2012/0073235 A1 | 3/2012 | Hannig |
| 2012/0124932 A1 | 5/2012 | Schulte et al. |
| 2012/0145845 A1 | 6/2012 | Hightower |
| 2012/0180416 A1 | 7/2012 | Perra et al. |
| 2012/0279161 A1* | 11/2012 | Hakansson .......... A47B 47/042 |
| | | 52/588.1 |
| 2012/0286637 A1 | 11/2012 | Fehre |
| 2013/0014463 A1 | 1/2013 | Pervan |
| 2013/0048632 A1 | 2/2013 | Chen |
| 2013/0071172 A1 | 3/2013 | Maertens et al. |
| 2013/0081349 A1 | 4/2013 | Pervan |
| 2013/0097846 A1 | 4/2013 | Pettigrew |
| 2013/0111845 A1 | 5/2013 | Pervan |
| 2013/0170904 A1 | 7/2013 | Cappelle et al. |
| 2013/0232905 A2 | 9/2013 | Pervan |
| 2013/0287484 A1 | 10/2013 | Phillips |
| 2014/0013919 A1 | 1/2014 | Gerke et al. |
| 2014/0055018 A1 | 2/2014 | Shein et al. |
| 2014/0111076 A1 | 4/2014 | Devos |
| 2014/0286701 A1 | 9/2014 | Sauer |
| 2014/0294498 A1 | 10/2014 | Logan |
| 2015/0034522 A1 | 2/2015 | Itou et al. |
| 2015/0035422 A1 | 2/2015 | Håkansson et al. |
| 2015/0078807 A1 | 3/2015 | Brännström et al. |
| 2015/0078819 A1 | 3/2015 | Derelöv et al. |
| 2015/0196118 A1* | 7/2015 | Derelov |
| 2015/0198191 A1 | 7/2015 | Boo |
| 2015/0230600 A1 | 8/2015 | Schulte |
| 2015/0330088 A1* | 11/2015 | Derelov ............... E04F 13/0894 |
| | | 52/588.1 |
| 2015/0368896 A1 | 12/2015 | Schulte |
| 2016/0000220 A1 | 1/2016 | Devos |
| 2016/0007751 A1 | 1/2016 | Derelöv |
| 2016/0145029 A1 | 5/2016 | Ranade et al. |
| 2016/0174704 A1 | 6/2016 | Boo et al. |
| 2016/0186925 A1 | 6/2016 | Bettin |
| 2016/0192775 A1 | 7/2016 | Andersson |
| 2016/0270531 A1 | 9/2016 | Derelöv |
| 2017/0079433 A1 | 3/2017 | Derelöv et al. |
| 2017/0089379 A1 | 3/2017 | Pervan |
| 2017/0097033 A1 | 4/2017 | Håkansson et al. |
| 2017/0159291 A1 | 6/2017 | Derelöv |
| 2017/0208938 A1 | 7/2017 | Derelöv et al. |
| 2017/0227031 A1 | 8/2017 | Boo |
| 2017/0227032 A1* | 8/2017 | Fridlund ............... F16B 5/0044 |
| 2017/0227035 A1 | 8/2017 | Fridlund |
| 2017/0234346 A1 | 8/2017 | Fridlund |
| 2017/0298973 A1 | 10/2017 | Derelöv |
| 2017/0360193 A1 | 12/2017 | Boo et al. |
| 2018/0080488 A1 | 3/2018 | Derelöv |
| 2018/0087552 A1 | 3/2018 | Derelöv et al. |
| 2018/0112695 A1 | 4/2018 | Boo et al. |

(56) References Cited

U.S. PATENT DOCUMENTS

| | | |
|---|---|---|
| 2018/0119717 A1 | 5/2018 | Derelöv |
| 2018/0202160 A1 | 7/2018 | Derelöv |
| 2018/0283430 A1 | 10/2018 | Leistert |
| 2018/0328396 A1 | 11/2018 | Fransson et al. |
| 2019/0113061 A1 | 4/2019 | Håkansson et al. |
| 2019/0166989 A1 | 6/2019 | Boo et al. |
| 2019/0191870 A1 | 6/2019 | Derelöv |
| 2019/0195256 A1 | 6/2019 | Derelöv |
| 2019/0289999 A1 | 9/2019 | Derelöv et al. |
| 2019/0320793 A1 | 10/2019 | Boo |
| 2019/0323532 A1 | 10/2019 | Boo |
| 2019/0323533 A1 | 10/2019 | Boo |
| 2019/0323534 A1 | 10/2019 | Derelöv |
| 2019/0323535 A1 | 10/2019 | Derelöv |
| 2020/0003242 A1 | 1/2020 | Brännström et al. |
| 2020/0055126 A1 | 2/2020 | Fridlund |
| 2020/0069048 A1 | 3/2020 | Derelöv et al. |
| 2020/0069049 A1 | 3/2020 | Derelöv et al. |
| 2020/0102978 A1 | 4/2020 | Fridlund |
| 2020/0121076 A1 | 4/2020 | Derelöv et al. |
| 2020/0214447 A1 | 7/2020 | Derelöv et al. |
| 2020/0300284 A1 | 9/2020 | Pervan |
| 2020/0337455 A1 | 10/2020 | Boo et al. |
| 2020/0340513 A1 | 10/2020 | Derelöv |
| 2021/0079650 A1 | 3/2021 | Derelöv |
| 2021/0180630 A1 | 6/2021 | Bruno et al. |
| 2021/0190112 A1 | 6/2021 | Derelöv |
| 2021/0207635 A1 | 7/2021 | Håkansson et al. |
| 2021/0222716 A1 | 7/2021 | Derelöv et al. |

FOREIGN PATENT DOCUMENTS

| | | |
|---|---|---|
| CH | 685 276 A5 | 5/1995 |
| CH | 696 889 A5 | 1/2008 |
| CH | 698 988 B1 | 12/2009 |
| CH | 705 082 A2 | 12/2012 |
| CN | 101099618 A | 1/2008 |
| CN | 102 917 616 A | 2/2013 |
| CN | 203424576 U | 2/2014 |
| DE | 1107910 B | 5/1961 |
| DE | 24 14 104 A1 | 10/1975 |
| DE | 25 14 357 A1 | 10/1975 |
| DE | 31 03 281 A1 | 8/1982 |
| DE | 228 872 A1 | 10/1985 |
| DE | 42 29 115 A1 | 3/1993 |
| DE | 94 17 168 U1 | 2/1995 |
| DE | 198 31 936 A1 | 2/1999 |
| DE | 298 20 031 U1 | 2/1999 |
| DE | 198 05 538 A1 | 8/1999 |
| DE | 203 04 761 U1 | 4/2004 |
| DE | 299 24 630 U1 | 5/2004 |
| DE | 20 2005 019 986 U1 | 2/2006 |
| DE | 20 2004 017 486 U1 | 4/2006 |
| DE | 20 2009 008 825 U1 | 10/2009 |
| DE | 10 2008 035 293 A1 | 2/2010 |
| DE | 10 2009 041 142 A1 | 3/2011 |
| DE | 10 2011 057 018 A1 | 6/2013 |
| DE | 10 2013 008 595 A1 | 11/2013 |
| DE | 20 2014 100 090 U1 | 11/2014 |
| DE | 10 2015 103 429 A1 | 10/2015 |
| DE | 10 2014 110 124 A1 | 1/2016 |
| DE | 20 2017 101 856 U1 | 4/2017 |
| EP | 0 060 203 A2 | 9/1982 |
| EP | 0 060 203 A3 | 9/1982 |
| EP | 0 357 129 A1 | 3/1990 |
| EP | 0 362 968 A | 4/1990 |
| EP | 0 675 332 A2 | 10/1995 |
| EP | 0 871 156 A2 | 10/1998 |
| EP | 1 048 423 A2 | 11/2000 |
| EP | 1 048 423 B9 | 5/2005 |
| EP | 1 650 375 A1 | 4/2006 |
| EP | 1 650 375 A8 | 4/2006 |
| EP | 1 671 562 A1 | 6/2006 |
| EP | 1 922 954 A1 | 5/2008 |
| EP | 2 017 403 A2 | 1/2009 |
| EP | 1 922 954 B1 | 7/2009 |
| EP | 2 333 353 A2 | 6/2011 |
| EP | 1 863 984 B1 | 11/2011 |
| EP | 2 487 373 A1 | 8/2012 |
| FR | 2 517 187 A1 | 6/1983 |
| FR | 2 597 173 A1 | 10/1987 |
| FR | 2 602 013 A1 | 1/1988 |
| GB | 245332 | 1/1926 |
| GB | 799155 A | 8/1958 |
| GB | 1 022 377 A | 3/1966 |
| GB | 2 163 825 A | 3/1986 |
| GB | 2 315 988 A | 2/1998 |
| GB | 2 445 954 A | 7/2008 |
| GB | 2 482 213 A | 1/2012 |
| GB | 2 520 927 A | 6/2015 |
| JP | S53-113160 U | 9/1978 |
| JP | H06-22606 U | 3/1994 |
| JP | 2003-239921 A | 8/2003 |
| KR | 10-1147274 B1 | 5/2012 |
| KR | 2014-0042314 A | 4/2014 |
| WO | WO 87/07339 A1 | 12/1987 |
| WO | WO 90/07066 | 6/1990 |
| WO | WO 99/22150 A1 | 5/1999 |
| WO | WO 99/41508 A2 | 8/1999 |
| WO | WO 00/66856 A1 | 11/2000 |
| WO | WO 01/53628 A1 | 7/2001 |
| WO | WO 02/055809 A1 | 7/2002 |
| WO | WO 02/055810 A1 | 7/2002 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/104436 A1 | 10/2006 |
| WO | WO 2007/015669 A2 | 2/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/017281 A1 | 2/2008 |
| WO | WO 2008/150234 A1 | 12/2008 |
| WO | WO 2009/136195 A1 | 11/2009 |
| WO | WO 2010/070472 A2 | 6/2010 |
| WO | WO 2010/070472 A3 | 6/2010 |
| WO | WO 2010/070605 A2 | 6/2010 |
| WO | WO 2010/087752 A1 | 8/2010 |
| WO | WO 2011/151737 A2 | 12/2011 |
| WO | WO 2011/151737 A3 | 12/2011 |
| WO | WO 2011/151737 A9 | 12/2011 |
| WO | WO 2011/151758 A2 | 12/2011 |
| WO | WO 2011/151758 A3 | 12/2011 |
| WO | WO 2012/095454 A1 | 7/2012 |
| WO | WO 2012/154113 A1 | 11/2012 |
| WO | WO 2013/009257 A1 | 1/2013 |
| WO | WO 2013/025163 A1 | 2/2013 |
| WO | WO 2013/080160 A1 | 6/2013 |
| WO | WO 2013/118075 A1 | 8/2013 |
| WO | WO 2014/072080 A1 | 5/2014 |
| WO | WO 2014/121410 A1 | 8/2014 |
| WO | WO 2015/015603 A1 | 2/2015 |
| WO | WO 2015/038059 A1 | 3/2015 |
| WO | WO 2015/105449 A1 | 7/2015 |
| WO | WO 2015/105450 A1 | 7/2015 |
| WO | WO 2015/105451 A1 | 7/2015 |

OTHER PUBLICATIONS

U.S. Appl. No. 15/567,507, Christian Boo, Peter Derelöv and Agne Pålsson, filed Oct. 18, 2017.
U.S. Appl. No. 15/956,949, Peter Derelöv, filed Apr. 19, 2018.
U.S. Appl. No. 15/978,630, Jonas Fransson, Niclas Håkansson and Agne Pålsson, filed May 14, 2018.
U.S. Appl. No. 16/220,574, Peter Derelöv, filed Dec. 14, 2018.
U.S. Appl. No. 16/220,585, Peter Derelöv, filed Dec. 14, 2018.
U.S. Appl. No. 16/386,874, Peter Derelöv, filed Apr. 17, 2019.
U.S. Appl. No. 16/567,436, Peter Derelöv and Mats Nilsson, filed Sep. 11, 2019.
U.S. Appl. No. 16/663,603, Magnus Fridlund, filed Oct. 25, 2019.
U.S. Appl. No. 16/703,077, Magnus Fridlund, filed Dec. 4, 2019.

(56) References Cited

OTHER PUBLICATIONS

U.S. Appl. No. 16/722,096, Peter Derelöv and Christian Boo, filed Dec. 20, 2019.
U.S. Appl. No. 16/697,335, Christian Boo and Peter Derelöv, filed Nov. 27, 2019.
U.S. Appl. No. 16/946,047, Darko Pervan, filed Jun. 4, 2020.
U.S. Appl. No. 16/861,639, Peter Derelöv, filed Apr. 29, 2020.
U.S. Appl. No. 16/951,394, Niclas Håkansson and Darko Pervan, filed Nov. 18, 2020.
U.S. Appl. No. 16/953,608, Peter Derelöv, Hans Brännström and Agne Pålsson, filed Nov. 20, 2020.
U.S. Appl. No. 17,119,392, filed Dec. 11, 2020.
U.S. Appl. No. 17/126,518, filed Dec. 18, 2020.
U.S. Appl. No. 16/951,394, Håkansson et al.
U.S. Appl. No. 16/953,608, Derelöv et al.
U.S. Appl. No. 17/119,392, Bruno et al.
U.S. Appl. No. 17/126,518, Derelöv et al.
Håkansson, Niclas, et al., U.S. Appl. No. 16/951,394 entitled "Mechanical Locking System for Building Panels," filed Nov. 18, 2020.
Derelöv, Peter, et al., U.S. Appl. No. 16/953,608 entitled "An Assembled Product and a Method of Assembling the Product," filed Nov. 20, 2020.
Bruno, Jimmie, e tal.U.S. Appl. No. 17/119,392 entitled "Mechanical Locking System for Panels," filed Dec. 11, 2020.
Derelöv, Peter, U.S. Appl. No. 17/126,518 entitled "Set of Panels with a Mechanical Locking Device," filed Dec. 18, 2020.
U.S. Appl. No. 16/861,639, Derelöv.
International Search Report dated Dec. 10, 2014 in PCT/SE2014/051061, Patent-och regislieringsverket, Stockholm, SE, 4 pages.
Extended European Search Report issued in EP Patent Application No. 14843242.0, dated Mar. 17, 2017, European Patent Office, Munich, DE, 8 pages.
Extended European Search Report issued in EP Patent Application No. 18210703.7, dated Jan. 4, 2019, European Patent Office, Munich, DE, 8 pages.
Derelöv, Peter, U.S. Appl. No. 16/861,639 entitled "Panels Comprising a Mechanical Locking Device and an Assembled Product Comprising the Panels," filed Apr. 29, 2020.
Meijer, Thomas, U.S. Appl. No. 17/398,416 entitled "Panels with Edge Reinforcement," filed Aug. 10, 2021.

* cited by examiner ively perpendicular to a second element, and a third element is connected essentially perpendicular to the second element. The assembled product comprises one or more locking devices, each comprising a flexible tongue arranged in an insertion groove at one of the at least three elements, said flexible tongue cooperates with a tongue groove, at an adjacent one of the at least three elements, for locking the one element and the adjacent element together. The second edge of the second element is connected to a second edge of the third element by a first of said locking devices.

ASSEMBLED PRODUCT AND A METHOD OF ASSEMBLING THE ASSEMBLED PRODUCT

CROSS REFERENCE TO RELATED APPLICATION

The present application is a continuation of U.S. application Ser. No. 16/564,438, filed on Sep. 9, 2019, which is a continuation of U.S. application Ser. No. 14/486,681, filed on Sep. 15, 2014, now U.S. Pat. No. 10,451,097, which claims the benefit of Swedish Application No. 1351060-7, filed on Sep. 16, 2013. The entire contents of each of U.S. application Ser. No. 16/564,438, U.S. application Ser. No. 14/486,681 and Swedish Application No. 1351060-7 are hereby incorporated herein by reference in their entirety.

TECHNICAL FIELD

The present disclosure relates to an assembled product, such as a box or a drawer, a furniture component or a furniture product, and a method of assembling the product. The assembled product is provided with a locking device comprising a flexible tongue.

BACKGROUND

A conventional furniture product is provided with a mechanical locking system as shown, for example, in WO 2012/154113 A1. The furniture product comprises a first panel connected perpendicularly to a second panel by a mechanical locking system comprising a flexible tongue in an insertion groove.

SUMMARY

An objective of some embodiments of the present disclosure is to provide an improvement over the above described technique and known art. A specific objective is to improve the method for assembling a furniture product.

A further objective of the present disclosure is to provide a furniture product with increased strength and stability.

At least some of these and other objectives and advantages that will be apparent from the present disclosure have been achieved by an assembled product comprising at least three elements arranged in three different planes, a first element is connected essentially perpendicular to a second element, and a third element is connected essentially perpendicular to the second element. The assembled product comprises one or more locking devices, each comprising a flexible tongue arranged in an insertion groove at one of the at least three elements, said flexible tongue cooperates with a tongue groove, at an adjacent one of the at least three elements, for locking the one element and the adjacent element together. The second edge of the second element is connected to a second edge of the third element by a first of said locking devices.

The elements may be panels, such as plastic panels or wood fibre based boards, such as HDF boards, particleboard or solid wood board. The panels may be provided with a decorative layer.

The assembled product may be a furniture component or a furniture product, such as a drawer, a cupboard, bookshelves, a wardrobe closet, a kitchen fixture, or a box for storing or transporting items.

The three planes are preferably essentially perpendicular to each other.

A first edge of the third element may be connected to a first edge of the first element by a second of said locking devices. The first element and the second element may be a first board and a second board, respectively, of a frame, and the third element may be the back piece of a bookshelf or a wardrobe closet. The third element, such as a back piece, connected by the first and the second of said locking devices, may increase the strength of the assembled product. The angle between first and the second element may be guided by the angle between the first and the second edge of the third element. A bookshelf or a wardrobe closet with perpendicular corners may be obtained easily by the embodiments described herein. The first edge of the third element may be connected slideable along the first edge of the first element in order to simplify assembling and disassembling.

A first edge of a sixth element may be connected essentially perpendicular to the first element, between the second and fourth elements. The sixth element may be essentially parallel to the second and fourth elements. The first edge of the sixth element may be connected by a seventh of said locking devices. The flexible tongue of the seventh of said locking devices is preferably arranged in an insertion groove at the first edge of the sixth element. The sixth element may be a fixed shelf of the assembled product, such as a bookshelf.

A fourth element may be connected essentially perpendicular to the first element, wherein a third edge of the third element may be connected to a second edge of the fourth element by a third of said locking devices.

The second and the fourth elements may be arranged essentially parallel and the third element may be connected slideable to the second and the fourth elements in order to facilitate disassembling.

A fourth edge of the third element may be arranged in a groove at a second edge of a fifth element. The fifth element may be connected essentially perpendicular to the second and fourth elements.

The assembled product may be a semi product for a drawer, without the fifth element that may be a front panel. The first, second and fourth elements may be boards of the frame and the third element may be the bottom board. The front panel may be connected essentially perpendicular to the second and fourth elements in the same factory as the semi product. Alternatively, the front panel may be connected essentially perpendicular to the second and fourth elements in another factory or by a carpenter at a construction site.

A first edge of the fifth element may be connected to a third edge of the second element by a fourth one of said locking devices, and a third edge of the fifth element may be connected to a third edge of the fourth element by a fifth one of said locking devices.

A first edge of the first element may be connected to a first edge of the second element by a sixth one of said locking devices.

A first edge of a forth element may be connected to a third edge of the first elements by a seventh one of said locking devices.

The insertion groove, in at least one of said locking devices, may extend along essentially the entire length of the edge of one of the at least three elements.

The tongue groove, in at least one of said locking devices, may extend along essentially the entire length of the edge of the adjacent one of the at least three elements.

A tongue groove and an insertion groove that extend along essentially the entire width (i.e., edge) of the one element and the adjacent element, respectively, may facilitate the production of the tongue groove and the insertion groove. The tongue groove and the insertion groove may be produce by displacing the element and the adjacent element, respectively, pass a fixed milling head.

The flexible tongue, in at least one of said locking devices, may be displaceable in the insertion groove during locking and un-locking of the locking device.

The locking devices may comprise an edge section groove at one of the elements or at the adjacent one of the elements. An edge section of the other of the one element or the adjacent element may cooperate with said edge groove for locking the one element and the adjacent element together. The flexible tongue and the tongue groove cooperate for locking the one element and the adjacent element together in a first direction and the edge section and the edge section groove cooperate for locking the one element and the adjacent element together in a second direction, perpendicular to the first direction.

The edge section of the elements may be provided with a calibrating groove.

The third element may be provided with a dismantling groove or recess at one or more of said locking devices. The dismantling groove or recess is preferably adapted for insertion of a dismantling tool. The dismantling tool may be inserted into the dismantling groove or recess to un-lock the locking device.

Any of the first, the second, the fourth or the fifth element may also be provided with a dismantling groove at any of the locking devices, and said dismantling groove or recess is preferably adapted for insertion of a dismantling tool. The dismantling tool may be inserted into the dismantling groove or recess to un-lock the locking device.

A second aspect of the invention is an assembled product, such as a furniture product, comprising at least two elements arranged as discussed herein. A first element is connected essentially perpendicular to an adjacent second element, with a main surface of the first element perpendicular to a main surface of the adjacent second element, by a locking device. The locking device includes a flexible tongue arranged in an insertion groove at one of the first and second elements. The flexible tongue cooperates with a tongue groove, at the other of the first and second elements for locking the first and second elements together. The first element or the adjacent second element is provided with a dismantling groove or recess for un-locking the locking device. Said dismantling groove or recess is preferably adapted for insertion of a dismantling tool.

The locking devices may comprise an edge section groove at the first element or at the adjacent second element. An edge section of the other of the first element or the adjacent second element may cooperate with said edge groove for locking the first element and the adjacent second element together. The flexible tongue and the tongue groove cooperate for locking the first element and the adjacent second element together in a first direction and the edge section and the edge section groove cooperate for locking the first element and the adjacent second element together in a second direction, perpendicular to the first direction. The dismantling groove or recess is preferably arranged at the edge section. The dismantling groove or recess may be covered by a covering plate.

BRIEF DESCRIPTION OF THE DRAWINGS

Embodiments of the present disclosure will by way of example be described in more detail with reference to the appended schematic drawings.

DETAILED DESCRIPTION

Figure 1A:
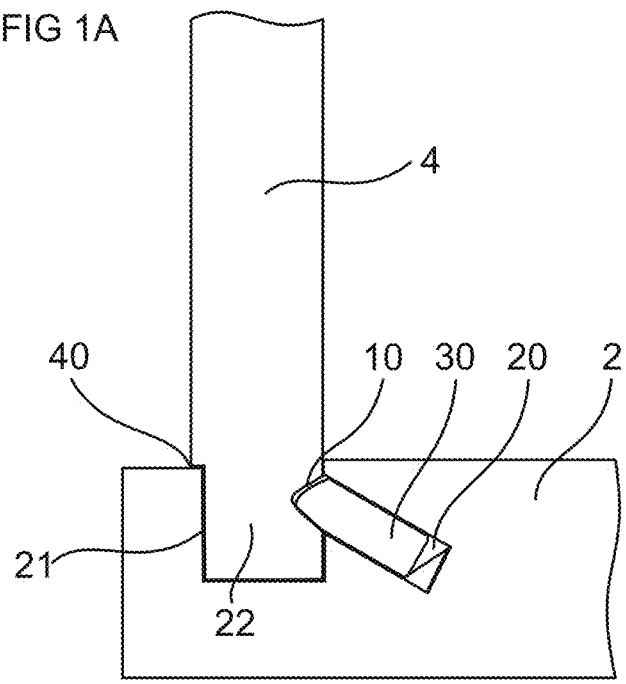
FIGS. 1A-1B show embodiments of a locking device for a furniture product.
Figure 1B:
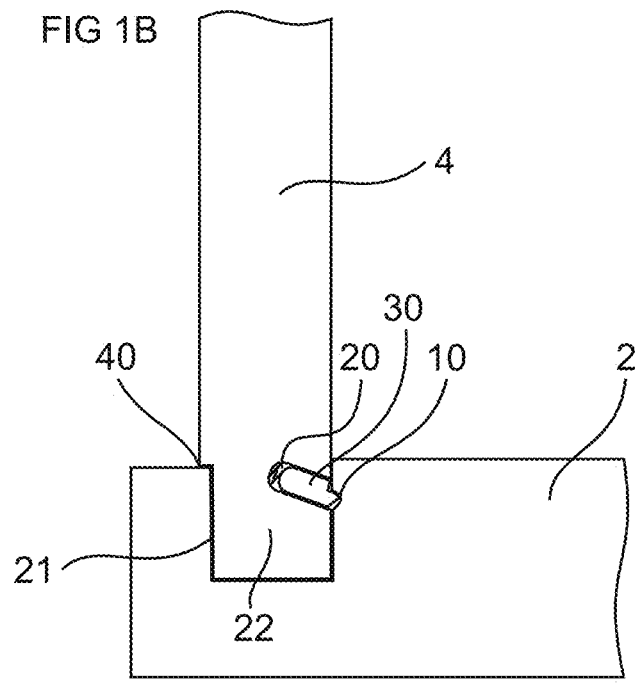

An embodiment of a locking device for locking an element 4 to an adjacent element 2 is shown in FIGS. 1A-1B. The element 4 and the adjacent element 2 may be boards of a furniture product that are connected perpendicular to each other, i.e., with a main surface of the element 4 perpendicular to a main surface of the adjacent element 2. An edge section 22 of the element 4 is arranged in an edge section groove 21 of the adjacent element 2 for locking the element 4 and the adjacent element 2 together in a first direction. The embodiment in FIG. 1A comprises a flexible tongue 30 arranged in an insertion groove 20 in the edge section groove 21 and a tongue groove 10 at the edge section 22. The embodiment in FIG. 1B comprises a flexible tongue 30 arranged in an insertion groove 20 at the edge section 22 and a tongue groove 10 in the edge section groove 21. The flexible tongue 30 and the tongue groove 10 cooperate for locking the element 4 and the adjacent element 2 together in a second direction, which is essentially perpendicular to the first direction. The flexible tongue 30 is, during assembling of the element 4 and the adjacent element 2, pushed into the insertion groove 20 when the edge section 22 is inserted into the edge section groove 21. The flexible tongue 30 springs back and into the tongue groove 10 when the element 4 and the adjacent element 2 have reached a connected state.

Figure 6A:
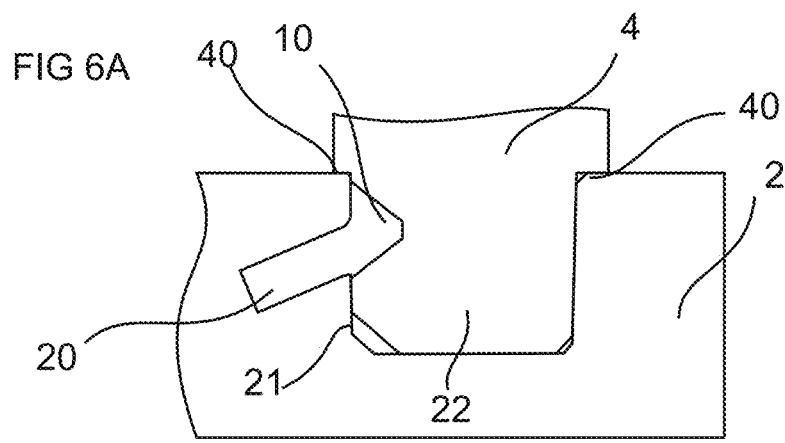
FIGS. 6A-6D show embodiments of a locking device for a furniture product.
Figure 6B:
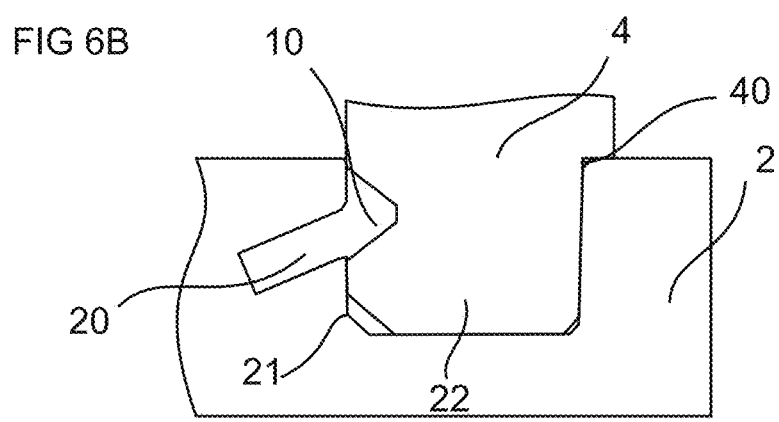

The element 4 may be a back piece of a bookshelf or a wardrobe closet, and the adjacent element 2 may be a board of the frame of the bookshelf of wardrobe closet. The element 4 may also be a bottom of a drawer and the adjacent element 2 may be a board of the frame of the drawer. Furthermore the element 4 and the adjacent element 2 may be a first and a second board respectively of a frame of a bookshelf, a wardrobe closet or a drawer. The back piece and the bottom may be a HDF board or a particleboard with a thickness of about 2-4 mm. A back piece with a thickness less than 2 mm may be too weak to stabilize the assembled product. A back piece is, for a great numbers of furniture products, the largest element, and a thickness over 4 mm may render the back piece cumbersome to assemble. Further embodiments may comprise one or more of the locking devices described above. The embodiments in FIGS. 1A and 1B include a calibrating groove 40 at one side of the edge section 22. However, the edge section 22 may include a second calibrating groove at the opposing side of the edge section (see, e.g., FIG. 6A).

Figure 2A:
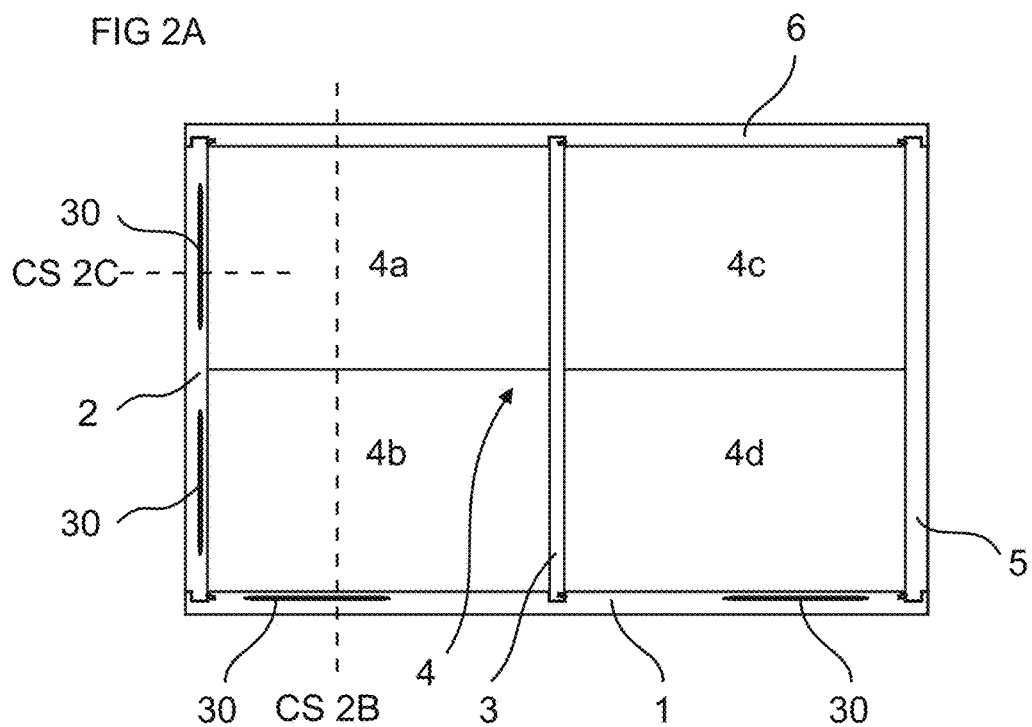
FIGS. 2A-2C show a furniture component or a furniture product according to disclosed embodiments.

FIG. 2A shows a furniture product, such as a bookshelf, comprising eight of the locking devices, arranged with a side of the frame facing downwards. The furniture product comprises a first element 1, e.g., a side of the bookshelf, connected at a first edge to a first edge of a second element 2, e.g., the top of the bookshelf, by one of the locking devices. A first edge of a third element 4, e.g., a rectangular back piece of the bookshelf, is connected to a second edge of the second element 2 by another of the locking devices. A second edge of the third element 4 is connected to second edge of the first element 1 by another of said locking devices. A first edge of a fourth element 5, e.g., a bottom of the bookshelf, is connected to a third edge of the first element 1 by another of said locking devices. An edge section 22 of a third edge of the third element 4 may be arranged in an edge section groove 21 at a second edge of the fourth element 5. A first edge of a fifth element 6, e.g., an opposite side of the bookshelf, is connected to a third edge of the fourth element 5, by another of said locking devices, and a third edge of the fifth element 6 is connected to a third edge of the second element 2, by another of said locking devices. An edge section 22 of a fourth edge of the third element 4 may be arranged in an edge section groove 21 at a second edge of the fifth element 6. The locking device at the first edge and the second edge, respectively, of the third element 4 may each comprise two or more flexible tongues 30. A sixth element 3, e.g., a shelf of the bookshelf, which is arranged parallel to the first element 1 and the fourth element 5, is connected, by another of the locking devices, at a first edge to the first element 1. A third edge of the sixth element 3 is connected, by another of the locking devices, to the fifth element 6. The flexible tongue 30 of the locking device at the first edge and third edge, respectively, of the sixth element 3 is preferably arranged at the edge section 22.

Figure 2B:
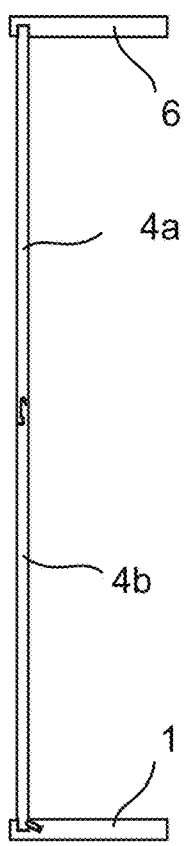
Figure 4A:
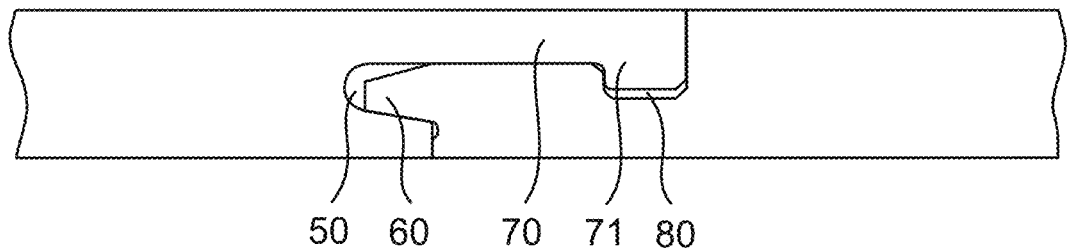
FIG. 4A shows a mechanical locking system for a furniture component according to an embodiment.

FIG. 2B shows a cross section CS 2B of the first element 1, the third element 4 and the fifth element 6. This figure shows that an edge section 22 of the fourth edge of the third element 4 may be arranged in the edge section groove 21 at the second edge of the fifth element 6. The third element 4 may comprise two or more boards 4a-4d locked by a mechanical locking system. A second edge of the sixth element 3 may be provided with another of the locking devices (not shown) for connecting adjacent edges of adjacent boards. FIG. 4A shows an embodiment of the mechanical locking system of the boards 4a-4d. The mechanical locking system comprises a tongue 60 at a first edge of a first board that cooperates with a tongue groove 50 at a second edge of a second board for locking the first and the second boards in a first direction. Furthermore, the locking system comprises a protruding strip 70 with a locking element 71 at the second edge. The locking element 71 cooperates with a locking groove 80 at the first edge for locking the first and the second boards in a second direction, which is perpendicular to the first direction. The boards and the locking system are preferably arranged in the assembled product, with the locking strip 70 facing the direction that is to be loaded. The locking system may remain locked if arranged in this way.

Figure 2C:
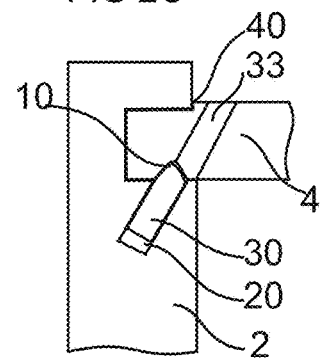

FIG. 2C shows a cross section CS 2C of the second and third elements 2, 4. The third element 4 is, in this embodiment, provided with a dismantling groove 33 adapted for insertion of a dismantling tool (not shown), which pushes the flexible tongue 30 into the insertion groove 20, which facilitates dismantling of the second and third elements 2, 4.

Figure 3A:
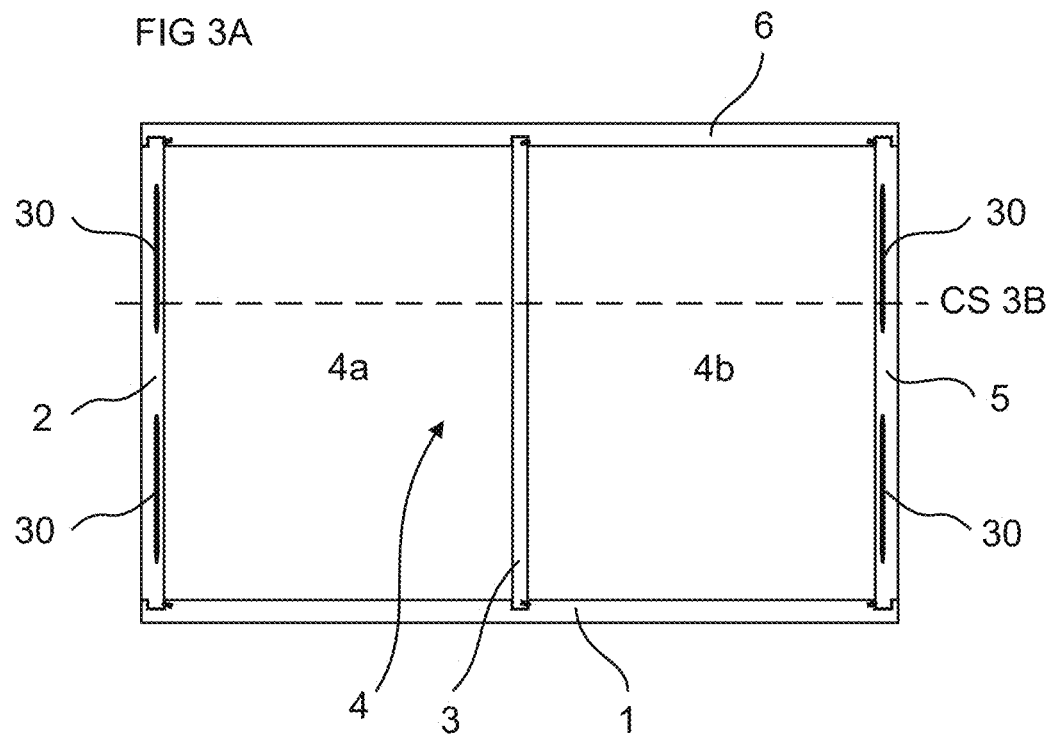
FIGS. 3A-3B show a furniture component or a furniture product according to an embodiment.

FIG. 3A shows a furniture product, such as a bookshelf, comprising eight of the locking devices, arranged with a side of the frame facing downwards. The furniture product comprises a first element 1, e.g., a side of the bookshelf, connected at a first edge to a first edge of a second element 2, e.g., the top of the bookshelf, by one of the locking devices. A first edge of a third element 4, e.g., a rectangular back piece of the bookshelf, is connected to a second edge of the second element 2 by another of the locking devices. An edge section 22 of a second edge of the third element 4 may be inserted into an edge section groove 21 of a second edge of the first element 1. A first edge of a fourth element 5, e.g., a bottom of the bookshelf, is connected to a third edge of the first element 1 by another of said locking devices. A third edge of the third element 4 is connected to a second edge of the fourth element 5 by another of said locking devices. A first edge of a fifth element 6, e.g., a side of the bookshelf, is connected to a third edge of the fourth element 5, by another of said locking devices, and a third edge of the fifth element 6 is connected to a third edge of the second element 2 by another of said locking devices. An edge section 22 of a fourth edge of the third element 4 may be arranged in an edge section groove 21 at a second edge of the fifth element 5. The locking device at the first and the third edges, respectively, of the third element 4 may each comprise two or more flexible tongues 30. A sixth element 3, e.g., a shelf of the bookshelf, which is arranged parallel to the first and the fourth elements 1, 5, is connected by another of the locking devices at a first edge to the first to the first element 1, and a third edge of the sixth element 3 is connected, by another of the locking devices, to the fifth element 6. The flexible tongue 30 of the locking device at the first and third edges, respectively, of the sixth element 3 is preferably arranged at the edge section 22. The third element 4 is preferably connected slideable at the first and the third edges in order to facilitate disassembling.

Figure 3B:
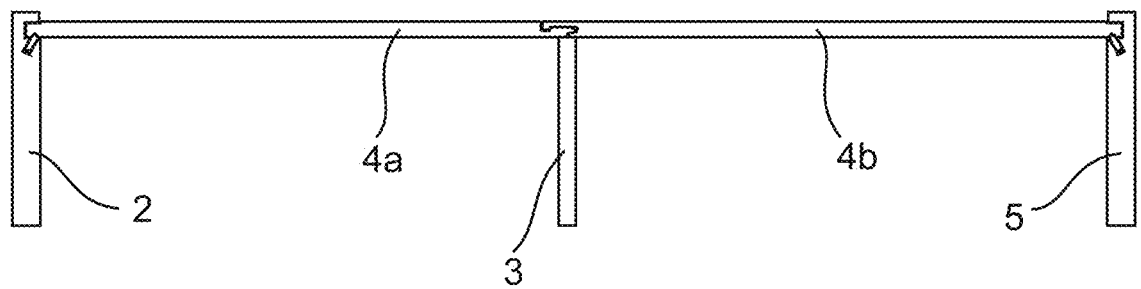

FIG. 3B shows a cross section CS 3B of the first element 1, the third element 4 and the fifth element 6. The third element 4 may comprise two or more boards 4a and 4b locked by the mechanical locking system described above.

Figure 4B:
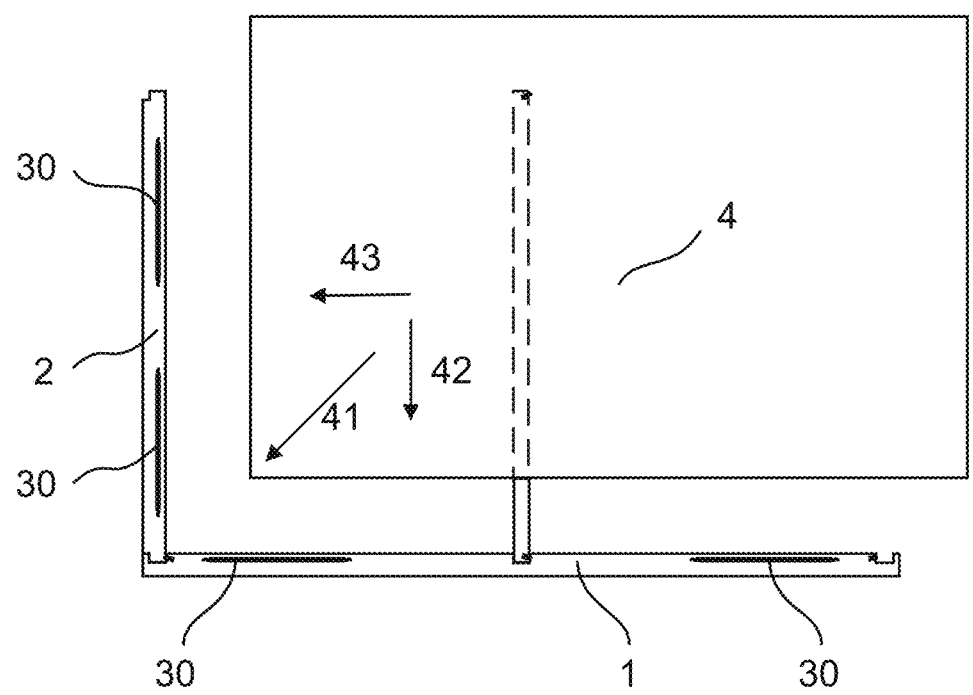
FIG. 4B shows a method of assembling a furniture component or a furniture product according to an embodiment.

FIG. 4B shows an embodiment of a method for assembling the product described in FIGS. 2A-2C. The first element 1, second element land sixth element 3 are preferably connected to each other before the third element 4 is connected to the product. The third element 4 may be displaced in a diagonal direction 41 such that the first edge and the second edge of the third element 4 is connected at the same time to the second edge of the first element 1 and to the second edge of the second element 2. An alternative is to displace the third element 4 in a first direction 42 perpendicular to the first element 1 and subsequently displace the third element 4 in a second direction 43 perpendicular to the second element 2. The first edge of the third element 4 is in this embodiment connected displaceable at the first edge. Another alternative is to displace the third element 4 in the second direction 43 perpendicular to the second element 2 and subsequently displace the third element 4 in the first direction 43 perpendicular to the first element 1. The second edge of the third element 4 is in this embodiment connected displaceable at the second edge. Further, the connected first element 1, second element 2 and sixth element 3 can together be displaced diagonally opposite to the direction 41 such that the second edge of the first element 1 and the second edge of the second element 2 are connected at the same time to the first edge and the second edge of the third element 4.

Figure 5A:
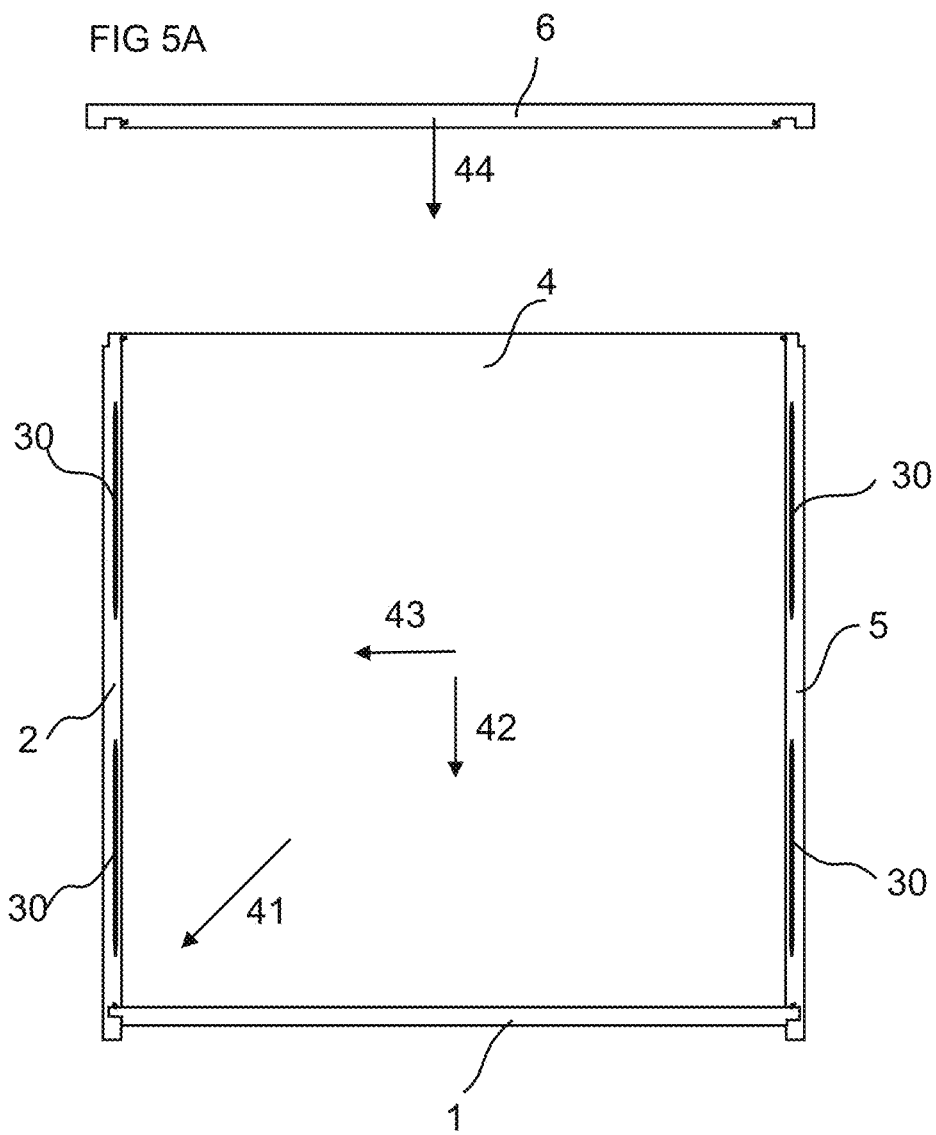
FIG. 5A shows a partly assembled furniture product or furniture component according to an embodiment.

FIG. 5A shows a furniture product, such as a drawer, comprising six of the locking devices, arranged with a side of the frame facing downwards. The furniture product comprises a first element 1, e.g., an inner side of the drawer, connected at a first edge to a first edge of a second element 2, e.g., a side of the drawer, by one of the locking devices. A first edge of a third element 4, e.g., a rectangular bottom of the drawer, is connected to a second edge of the second element 2 by another of the locking devices. An edge section 22 of a second edge of the third element 4 may be inserted into an edge section groove 21 of a second edge of the first element 1. A first edge of a fourth element 5, e.g., a side of the drawer, is connected to a third edge of the first element 1 by another of said locking devices. A third edge of the third element 4 is connected to a second edge of the fourth element 5 by another of said locking devices. A first edge of a fifth element 6, e.g., a front panel of the drawer, is subsequently connected to a third edge of the fourth element 5 by another of said locking devices, and a third edge of the fifth element 6 is connected to a third edge of the second element 2 by another of said locking devices. The fifth element 6 may be connected in the same factory in which the first through fourth elements 1, 2, 4, 5 are connected, or alternatively in another factory or by a carpenter at a construction site. An edge section 22 of a fourth edge of the third element 4 may be arranged in an edge section groove 21 at a second edge of the fifth element 5. The locking device at the first edge and the third edge, respectively, of the third element 4 may each comprise two or more flexible tongues 30. The third element 4 is preferably connected slideable at the first edge and the third edge in order to facilitate disassembling.

The fifth element 6 (front panel) may be displaced during connection in a direction 44 perpendicular to the fourth edge of the third element 4, and to the third edges of the second and fourth elements 2, 5. The bottom panel of the drawer in this embodiment may be connected with the same methods as described under FIG. 4B.

Figure 5B:
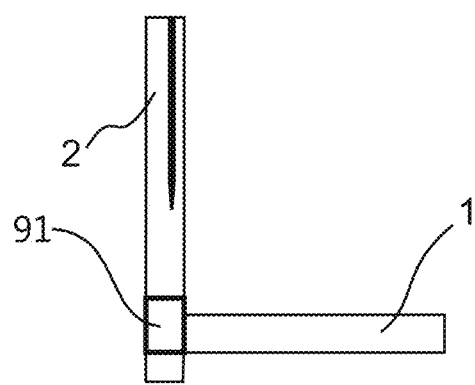
FIG. 5B shows a corner section of a furniture component or a furniture product according to an embodiment.

FIG. 5B shows that the corner section between, for instance, the first element 1 and the second element 2 may be provide with a cover plate 91, in order to hide the locking device.

Figure 6C:
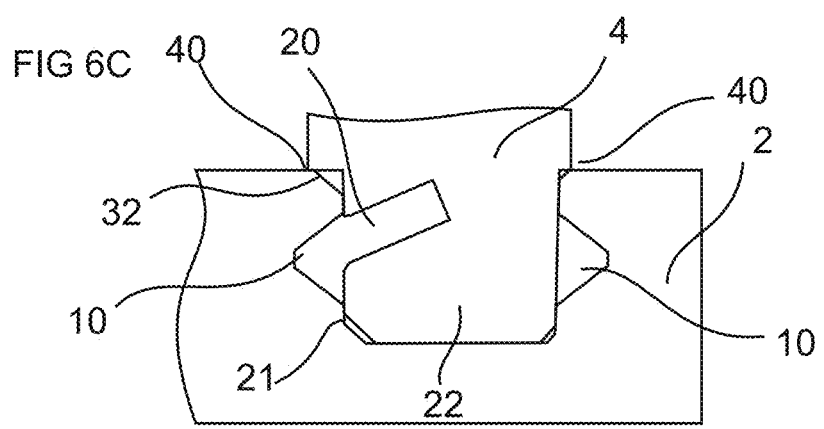
Figure 6D:
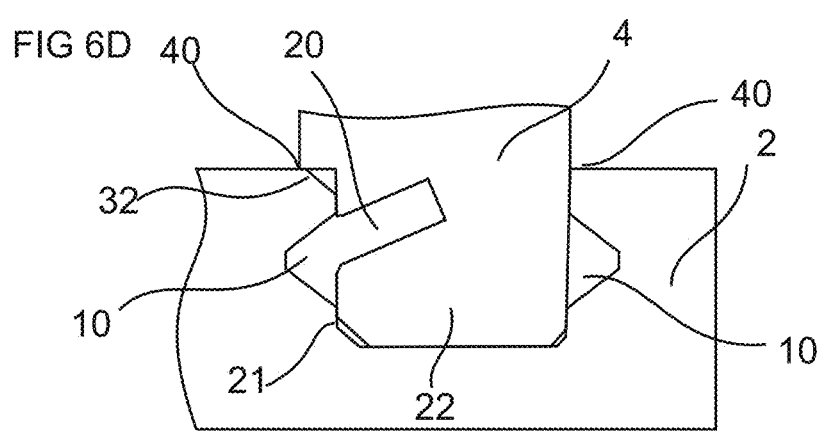

FIGS. 6A-6D show alternative embodiments of the locking device. In these embodiments, a calibrating groove 40 may be provided at one or two sides of the edge section 22. The tongue groove 10 may be symmetric at upper and lower parts of the groove such that the same dismantling tool (not shown) can be used at opposite positions of the locking device, i.e., mirror inverted locking devices. The edge section groove 21 may be provided with a guiding surface 32 that facilitates insertion of the edge section 22 into the edge section groove 21. The edge section groove 21 may be provided with two opposite tongue grooves 10 as shown in FIGS. 6C and 6D. The two opposite tongue grooves 10 may be made by an end cutter, such as by a craftsman on site.

Figure 7A:
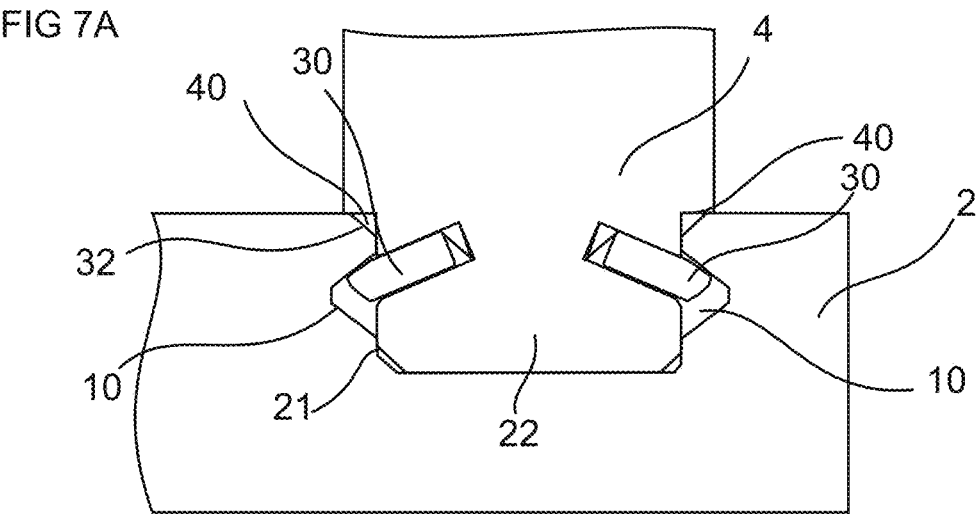
FIG. 7A shows an embodiment of a locking device for a furniture product.

FIG. 7A shows that the embodiment with two opposite tongue grooves 10 may be provided with two flexible tongues 30.

Figure 7B:
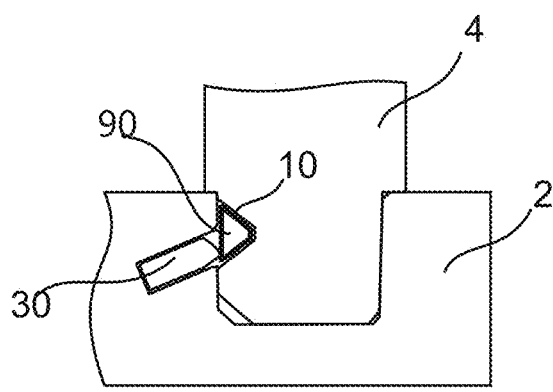
FIGS. 7B-7C show embodiments of a locking device for a furniture product and a disassembling tool.
Figure 7C:
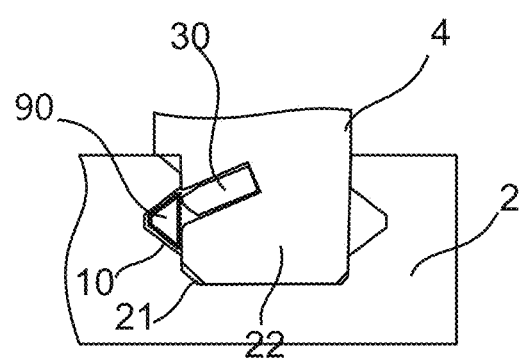

FIGS. 7B-7C show disassembling of the locking device by inserting a symmetric dismantling tool 90 into a symmetric tongue groove 10.

Figure 7D:
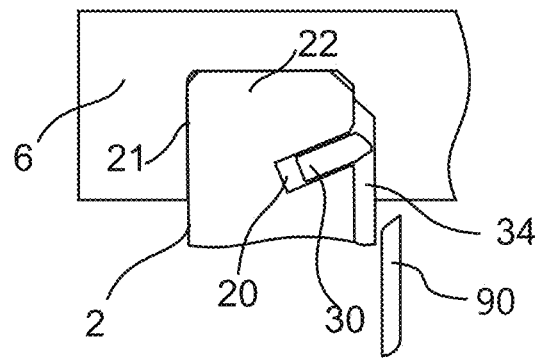
FIGS. 7D-E show embodiments of a locking device provided with a disassembling recess and a disassembling tool.
Figure 7E:
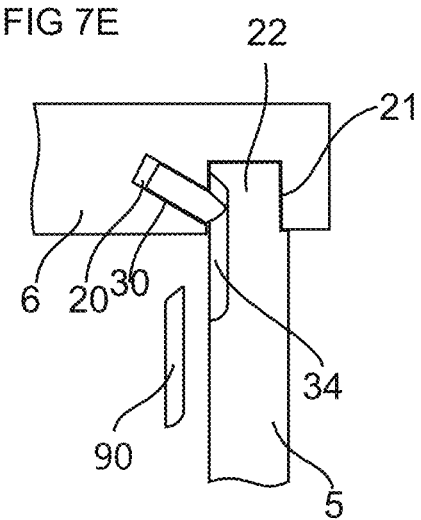

FIGS. 7D-7E show alternative embodiments provided with a dismantling recess 34. These embodiments may be an alternative to the embodiment shown in FIG. 2C, if for example, it is desired to un-lock the locking device from the inside of a furniture product, such as a drawer, a box or a bookshelf. These embodiments may also be used to connect the fifth element 6 to the second and fourth elements 2, 5 in the embodiment shown in FIG. 5A. The tongue 30 is arranged in the edge section groove 21 in FIG. 7E and at the edge section 22 in FIG. 7D. The edge section 22 in FIG. 7E is provided with a dismantling recess 34 which adapted to accommodate a dismantling tool 90. The tongue 30 is pushed back into the displacement groove 20 to un-lock the locking device when the dismantling tool 90 is inserted into the dismantling recess 34. The dismantling recess 34 may be covered by a covering plate (not shown). The embodiments with the dismantling groove 33 or recess 34 are particular advantageous for embodiments which do not have a tongue groove 10 that is accessible from an outer end of the tongue groove 10 for insertion of a dismantling tool. However, the embodiments with the dismantling groove 33 or recess 34 may be used to connect any adjacent elements in order to facilitate disassembling.

The invention claimed is:

1. An assembled furniture product comprising at least two panels arranged in two different planes which are essentially perpendicular to each other, wherein:
    the at least two panels include a first panel connected perpendicular to a second panel by a locking device;
    the locking device comprises an edge section groove at a surface of the first panel, wherein an edge section of the second panel cooperates with the edge section groove for locking the first panel and the second panel together in a first direction;
    the locking device comprises a flexible tongue arranged in an insertion groove in the edge section groove, the insertion groove being formed between opposing insertion groove walls;
    the flexible tongue cooperates with a tongue groove in the edge section for locking the first panel and the second panel together in a second direction which is perpendicular to the first direction, the tongue groove being formed between opposing tongue groove walls;
    the insertion groove walls are non-parallel to the tongue groove walls; and
    a width of an opening of the tongue groove is greater than a width of an opening of the insertion groove.

2. The assembled furniture product as claimed in claim 1, wherein the locking device is configured to be unlocked by inserting a dismantling tool into the tongue groove for disassembling of the first panel and the second panel.

3. The assembled furniture product as claimed in claim 1, wherein the tongue groove extends along essentially an entire length of an edge of the second panel.

4. The assembled furniture product as claimed in claim 3, wherein the insertion groove extends along essentially the entire length of an edge of the first panel.

5. The assembled furniture product as claimed in claim 1, wherein the flexible tongue is displaceable in the insertion groove.

6. The assembled furniture product as claimed in claim 1, wherein the edge section is provided with a calibrating groove.

* * * * *